US008305262B1

(12) United States Patent
Nuthalapati

(10) Patent No.: US 8,305,262 B1
(45) Date of Patent: Nov. 6, 2012

(54) MISMATCHED PULSE COMPRESSION OF NONLINEAR FM SIGNAL

(75) Inventor: Rao Nuthalapati, Delran, NJ (US)

(73) Assignee: Lockheed Martin Corporation, Bethesda, MD (US)

(*) Notice: Subject to any disclaimer, the term of this patent is extended or adjusted under 35 U.S.C. 154(b) by 318 days.

(21) Appl. No.: 12/719,060

(22) Filed: Mar. 8, 2010

(51) Int. Cl.
*G01S 7/28* (2006.01)

(52) U.S. Cl. ........................ 342/196; 342/194; 342/189

(58) Field of Classification Search .......... 342/194–196, 342/189, 95–97
See application file for complete search history.

(56) References Cited

U.S. PATENT DOCUMENTS

| | | | | |
|---|---|---|---|---|
| 4,973,967 | A * | 11/1990 | David et al. | 342/122 |
| 5,047,780 | A * | 9/1991 | Dijkstra | 342/145 |
| 5,760,732 | A * | 6/1998 | Marmarelis et al. | 342/145 |
| 5,907,568 | A * | 5/1999 | Reitan, Jr. | 342/26 B |
| 7,109,916 | B2 * | 9/2006 | Klinnert et al. | 342/134 |
| 7,629,920 | B1 * | 12/2009 | Kuhl et al. | 342/160 |
| 7,880,672 | B1 * | 2/2011 | Doerry | 342/201 |
| 8,022,863 | B1 * | 9/2011 | Nuthalapati | 342/189 |
| 8,193,972 | B2 * | 6/2012 | Hofele | 342/194 |
| 2007/0046526 | A1 * | 3/2007 | O'Hora et al. | 342/26 R |
| 2007/0194976 | A1 * | 8/2007 | Reed et al. | 342/22 |
| 2008/0018526 | A1 * | 1/2008 | Wade | 342/204 |
| 2008/0074311 | A1 * | 3/2008 | Atherton | 342/202 |

FOREIGN PATENT DOCUMENTS

KR 2010124105 A * 11/2010

OTHER PUBLICATIONS

T. Collins and P. Atkins, "Nonlinear frequency modulation chirps for active sonar", IEE Proc. Radar, Sonar, and Navigation, vol. 146, No. 6, Dec. 1999, pp. 312-316.

* cited by examiner

*Primary Examiner* — John B Sotomayor
(74) *Attorney, Agent, or Firm* — Howard IP Law Group, PC

(57) ABSTRACT

A signal processing method includes transforming a received NLFM waveform from a first domain to a second domain, multiplying the transform of the received NLFM waveform with a complex conjugate of a low-pass filtered and transformed reference signal, and inverse transforming a product of the multiplication from the second domain to the first domain.

20 Claims, 8 Drawing Sheets

502 SAMPLING A WAVEFORM RECEIVED AT A RECEIVER
504 TRANSFORMING THE SAMPLES OF THE RECEIVED SIGNALS FROM A FIRST DOMAIN TO A SECOND DOMAIN
506 LOW-PASS FILTERING A REFERENCE SIGNAL
508 TRANSFORMING THE LOW-PASS FILTERED REFERENCE SIGNAL FROM THE FIRST DOMAIN TO THE SECOND DOMAIN
510 TRANSPOSING THE TRANSFORMED REFERENCE SIGNAL TO ACQUIRE THE COMPLEX CONJUGATE
512 MULTIPLYING THE TRANSFORMED RECEIVED SIGNAL WITH THE FILTERED AND TRANSFORMED REFERENCE SIGNAL
514 INVERSE TRANSFORMING A PRODUCT OF THE MULTIPLICATION FROM THE SECOND DOMAIN TO THE FIRST DOMAIN

MISMATCHED PULSE COMPRESSION OF NONLINEAR FM SIGNAL

STATEMENT REGARDING FEDERALLY SPONSORED RESEARCH OR DEVELOPMENT

This invention was made with Government Support under Contract No. N00024-03-C-6110 awarded by the Department of the Navy. The Government has certain rights in this invention.

FIELD OF DISCLOSURE

The disclosed systems and methods relate to pulse compression. More specifically, the disclosed systems and methods relate to pulse compression of nonlinear frequency modulated (FM) signals.

BACKGROUND

Pulse compression radar systems utilize waveforms that have narrow autocorrelation functions and time-bandwidth (TB) products that are much higher than unity enabling good range resolution (bandwidth dependent) and target detection (energy dependent). In operation, a known electromagnetic pulse is transmitted from a transmitting device, e.g., a transmitter or transceiver, and the transmitted pulse reflects off an object. The reflected signal is received at the receiver or transceiver and undergoes various signal processing techniques including signal pulse compression.

FIG. 1 illustrates one example of a conventional matched filter (cross-correlation) processing channel 100 for pulse compressing waveforms. As shown in FIG. 1, a received signal undergoes a fast Fourier transform (FFT) at block 102 to transform the received signal from the time domain to the frequency domain. Similarly, the reference signal is fast Fourier transformed at block 108 to transform the reference signal into the frequency domain. At block 110, the complex conjugate of the transformed reference is taken and multiplied with the transform of the received signal at block 104. The product of the multiplication performed at block 104 undergoes an inverse FFT (IFFT) at block 106 to convert the product back to the time domain. The output of the IFFT 106 is the matched filter output. However, the matched filter output from the conventional processing channel 100 exhibits intolerance to a Doppler shift unless the transmitted signal is weighted. The graphical result of a cross-correlation is illustrated in FIG. 2, which shows a composite function including a mainlobe 10 and a plurality of sidelobes 20. In contrast to the composite function illustrated in FIG. 2, an ideal autocorrelation function will have a mainlobe width of zero and zero sidelobes. However, practical finite-duration and finite-bandwidth waveforms have non-zero autocorrelation widths and finite sidelobe levels, which limit the target dynamic range. The limited dynamic range may have a negative effect on the radar system as a weaker target may be located in one of sidelobes and therefore avoid being detected.

NLFM waveforms have lower peak sidelobe levels (PSLs) and do not incur losses due to weighting compared to linear frequency modulated (LFM) waveforms. Additionally, NLFM waveforms have a constant-amplitude envelope, which enables efficient generation of high power signals, with a continuous phase so that they are spectrally well contained. Accordingly, these features have led to the implementation of NLFM waveforms in pulse compression radar systems for tracking targets.

However, the pulsed compressed output of NLFM waveforms degrades if there is an uncompressed Doppler shift. Specifically, the mainlobe widens and the PSL increases. The Doppler intolerance of NLFM waveforms is illustrated in FIGS. 3A-3D, which are graphs of the NLFM signal strength versus range for stationary (lines 300) and moving targets, e.g., targets moving at Mach 1 (lines 301), Mach 2 (lines 302), and Mach 3 (lines 303), in radar systems having various TB products. Specifically, FIG. 3A illustrates the NLFM waveforms for a system having a TB product equal to 16; the waveforms illustrated in FIG. 3B are for a system having a TB product equal to 64; the waveforms illustrated in FIG. 3C is for a system having a TB product of 256; and the waveforms illustrated in FIG. 3D are for a system having a TB of 1024. FIGS. 3A-3D show that as the TB product is increased from 16 to 1024, the NLFM waveforms experience an increasingly larger Doppler shift causing the distortion to the right of the mainlobe for targets moving at Mach 1 (i.e., the speed of sound), Mach 2 (i.e., twice the speed of sound), and Mach 3 (i.e., three times the speed of sound).

Hybrid NLFM processing has been developed in an attempt to compensate for the Doppler shift experienced by NLFM waveforms. An example of Hybrid processing is disclosed by Collins et al. in *Nonlinear Frequency Modulation Chirps for Active Sonar*, IEEE Proc. Radar, Sonar, and Navigation, Vol. 146, No. 6, December 1999, pp 312-316, the entirety of which is incorporated by reference herein. In Hybrid NLFM systems, the NLFM waveform is designed using the principle of stationary phase and a frequency weighting function such as Taylor weighting. The resultant waveform does not experience mismatch loss if pulse-compressed; however, the waveform will experience weighting loss. While Hybrid NLFM provides some Doppler tolerance, it does so at the expense of resolution as due to the weighting loss.

Accordingly, an improved system and method for processing NLFM waveforms are desirable.

SUMMARY

A signal processing method for processing nonlinear frequency modulated (NLFM) waveforms is disclosed. The method includes transforming a received NLFM waveform from a first domain to a second domain, multiplying the transform of the received NLFM waveform with a complex conjugate of a low-pass filtered and transformed reference signal, and inverse transforming a product of the multiplication from the second domain to the first domain.

A system for processing NLFM waveforms is also disclosed. The system includes a computer readable storage medium in signal communication with a processor. The processor is configured to transform a received NLFM waveform from a first domain to a second domain, multiply the transform of the received NLFM waveform with a complex conjugate of a low-pass filtered and transformed reference signal, and inverse transform a product of the multiplication from the second domain to the first domain.

Also disclosed is a computer readable storage medium encoded with computer program code. When the computer program code is executed by a processor, the processor performs a method that includes transforming a received NLFM waveform from a first domain to a second domain, multiplying the transform of the received NLFM waveform with a complex conjugate of a low-pass filtered and transformed reference signal; and inverse transforming a product of the multiplication from the second domain to the first domain.

DETAILED DESCRIPTION

Figure 4:
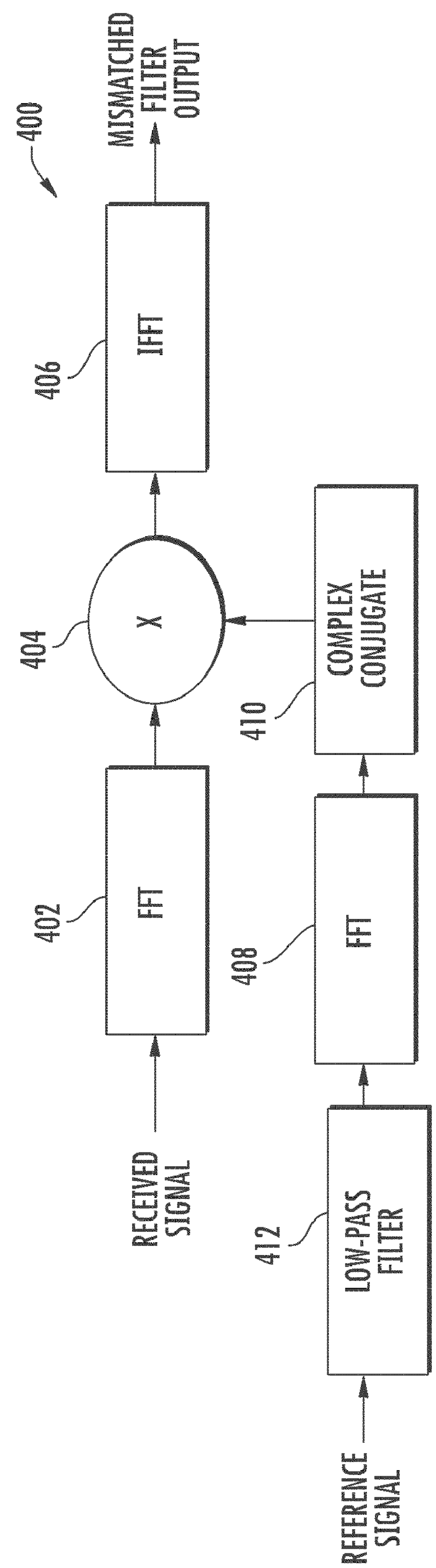
FIG. 4 illustrates one example of an improved signal processing channel for nonlinear frequency modulated signals.

FIG. 4 illustrates an improved processing channel 400 for processing NLFM waveforms. As shown in FIG. 4, a received signal is received and transformed by an FFT at block 402. The reference signal undergoes low-pass filtering at block 412, and the output of the low-pass filter is transformed by an FFT at block 408. The complex conjugate of the low-pass filtered and transformed reference signal is taken at block 410 and multiplied with the transformed received signal at block 404. At block 406, the product of the multiplication is inverse transformed using an IFFT to provide the mismatched filter output.

Low-pass filtering the reference signal prior to taking its transform advantageously smoothes the Fresnel ripple of the NLFM waveform spectrum to create a mismatched pulse compression. Additionally, the low-pass filtering of the NLFM reference waveform provides for a more Doppler tolerant response and improved PSL performance while exhibiting only a slight decrease in sensitivity.

Figure 5:
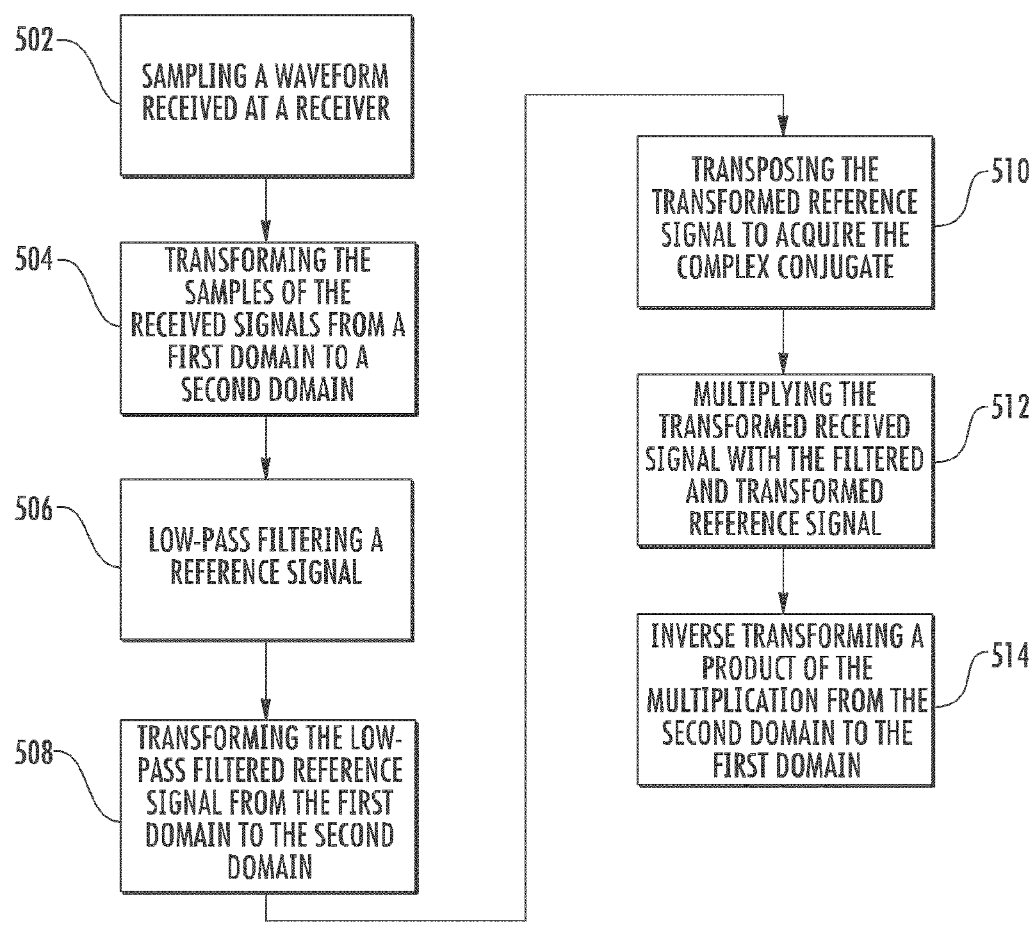
FIG. 5 illustrates one example of a computer architecture configured as a signal processing channel.

FIG. 5 is a flow diagram of one example of a method 500 for processing an NLFM signal. At block 502, a waveform is received and sampled. In some embodiments, the waveform is received at an antenna 632 and sampled by an analog-to-digital converter (ADC) 630, which may be coupled to a computer system 600 as shown in FIG. 6.

Figure 6:
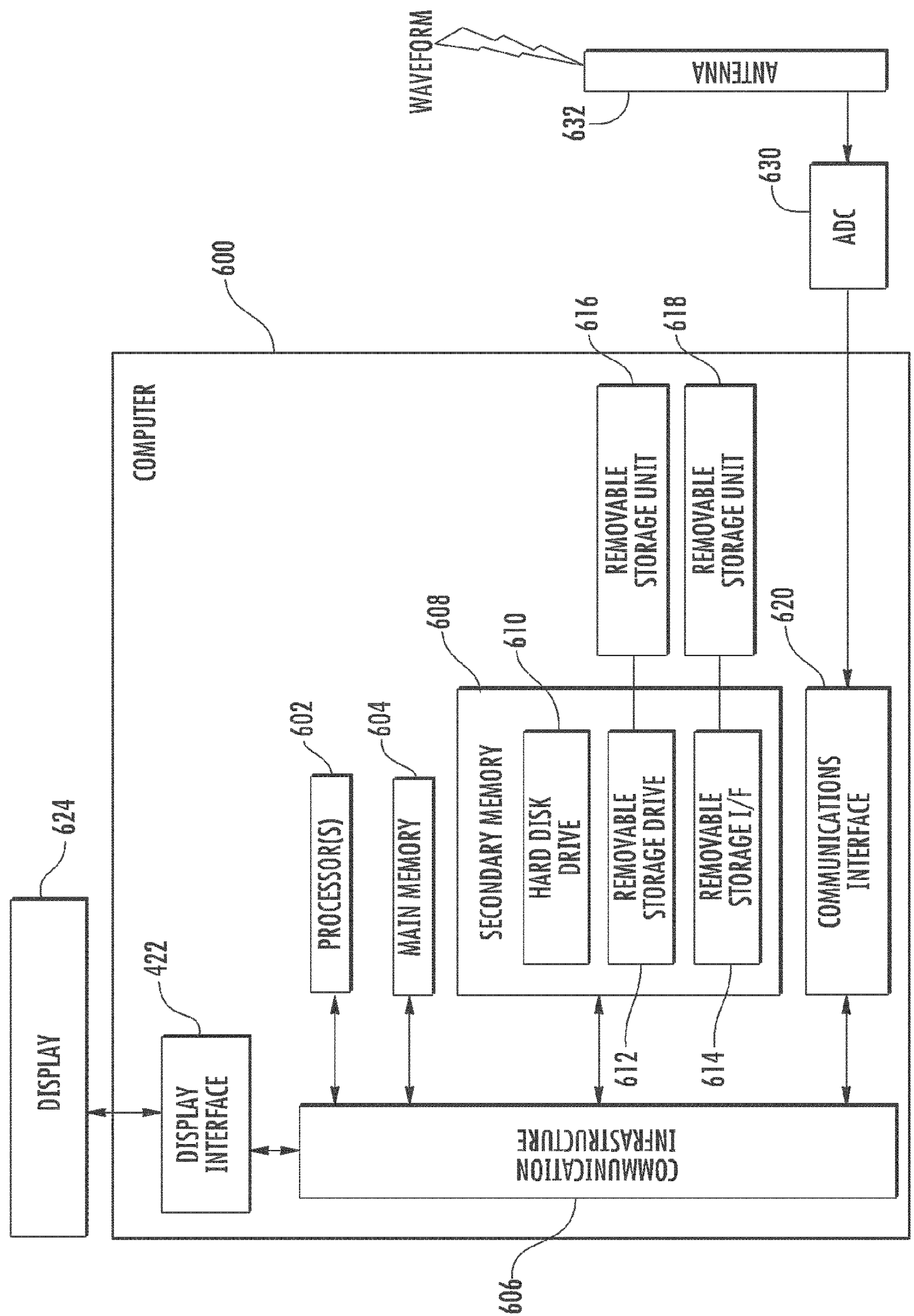
FIG. 6 is a flow diagram of a signal processing method.

As shown in FIG. 6, the computer system 600 may include one or more processors, such as processor(s) 602. Processor(s) 602 may be any central processing unit (CPU), microprocessor, micro-controller, or computational device or circuit for executing instructions and be connected to a communication infrastructure 606 (e.g., a communications bus, cross-over bar, or network). Various software embodiments are described in terms of this exemplary computer system. After reading this description, it will be apparent to one skilled in the art how to implement the method using other computer systems or architectures.

Computer system 600 may include a display interface 622 that forwards graphics, text, and other data from the communication infrastructure 606 (or from a frame buffer not shown) for display on a monitor or display unit 624.

Computer system also includes a main memory 604, such as a random access (RAM) memory, and may also include a secondary memory 608. The secondary memory 608 may include a more persistent memory such as, for example, a hard disk drive 610 and/or removable storage drive 612, representing a floppy disk drive, a magnetic tape drive, an optical disk drive, or the like. The removable storage drive 612 reads from and/or writes to a removable storage unit 616 in a manner that is understood by one skilled in the art. Removable storage unit 612 represents a floppy disk, magnetic tape, optical disk, or the like, which may be read by and written to by removable storage drive 612. As will be understood by one skilled in the art, the removable storage unit 616 may include a computer usable storage medium having stored therein computer software and/or data.

In some embodiments, secondary memory 608 may include other devices for allowing computer programs or other instructions to be loaded into computer system 600. Such devices may include, for example, a removable storage unit 618 and a corresponding interface 618. Examples of such units 618 and interfaces 614 may include a program cartridge and cartridge interface (such as that found in video game devices), a removable memory chip (such as an erasable programmable read only memory (EPROM)), or programmable read only memory (PROM)) and associated socket, and other removable storage units 618 and interfaces 614, which allow software and data to be transferred from the removable storage unit 618 to computer system 600.

Computer system 600 may also include a communications interface 620, which allows software and data to be transferred between computer system 600 and external devices such as, for example, antenna 632 and ADC 630. Examples of communications interface 620 may include, without limitation, a modem, a network interface (such as an Ethernet card), a communications port, a Personal Computer Memory Card International Association (PCMCIA) slot and card, or any combination thereof. Software and data transferred via communications interface 620 are in the form of signals, which may be electronic, electromagnetic, optical, or other signals capable of being received by communications interface 620. These signals are provided to communications interface 620 via a communications path or channel. The channel may be implemented using wire or cable, fiber optics, a telephone line, a cellular link, a radio frequency (RF) link, or other communication channels.

In this document, the terms "computer program medium" and "computer readable medium" refer to media such as removable storage units 616, 618, or a hard disk installed in hard disk drive 610. These computer program products provide software to computer system 600. Computer programs (also referred to as computer control logic) may be stored in main memory 604 and/or secondary memory 608. Computer programs may also be received via communications interface 620. Such computer programs, when executed by a processor(s) 602, enable the computer system 600 to perform the features of the method discussed herein.

In an embodiment where the method is implemented using software, the software may be stored in a computer program product and loaded into computer system 600 using removable storage drive 612, hard drive 610, or communications interface 606. The software, when executed by a processor(s) 602, causes the processor(s) 602 to perform the functions of the method described herein.

In another embodiment, the method is implemented primarily in hardware using, for example, hardware components such as application specific integrated circuits (ASICs). Implementation of the hardware state machine so as to perform the functions described herein will be understood by persons skilled in the art. In yet another embodiment, the method is implemented using a combination of both hardware and software.

At block 504, the samples of the received NLFM signal are transformed from a first domain to a second domain. As described above, the signals may be transformed from the time domain to the frequency domain using an FFT.

At block 506, a reference signal, e.g., the originally transmitted NLFM waveform, is low pass filtered. Low-pass filtering the NLFM waveform smoothes the Fresnel ripple. At block 508, the low-pass filtered reference signal is transformed from the first domain to the second domain. In one example, the low-pass filtered reference signal may be transformed from the time domain to the frequency domain using an FFT as understood by one skilled in the art.

The complex conjugate of the low-pass filtered and transformed NLFM reference signal is taken at block 510. One skilled in the art will understand that blocks 506, 508, and 510 may be performed before, simultaneously with, or after blocks 502 and 504.

At block 512, the complex conjugate of the low-pass filtered and transformed NLFM reference signal is multiplied with the transform of the received signal. The product of the multiplication may be inverse transformed from the second domain back to the first domain at block 514. For example, the result of the multiplication may undergo an inverse FFT (IFFT) to inverse transform the result from the frequency domain to the time domain.

An 18-tap low-pass filter was simulated using ⅛ as the normalized cutoff frequency and a 25 dB Chebyshev window function for a plurality of time-bandwidth (TB) products with a sampling rate equal to eight times the bandwidth. Table 1 below identifies the results of the simulations for the various TB products and the measure of the PSLs without a Doppler shift, an uncompensated Doppler shift, the low-pass filtering method described herein, and the mismatched loss. The results are shown for an uncompensated Doppler of 0.05, i.e., the product of the pulse width and the Doppler frequency.

TABLE 1

| TB | PSL (dB) (No Doppler Shift) | PSL (dB) (Uncompensated Doppler Shift) | PSL (dB) (Low-Pass Filtered) | Mismatch Loss (dB) |
|---|---|---|---|---|
| 512 | −42.03 | −38.28 | −45.99 | 0.046 |
| 1024 | −45.27 | −39.52 | −50.36 | 0.045 |
| 2048 | −47.80 | −40.13 | −53.47 | 0.045 |
| 4096 | −49.29 | −40.42 | −52.93 | 0.044 |
| 8192 | −50.10 | −40.57 | −52.60 | 0.044 |

As shown in Table 1, the mismatched loss stays approximately constant over different TB products. In contrast, the Doppler performance of the uncompensated NLFM degrades with the increasing product of pulse width and Doppler frequency. Both finite impulse response (FIR) and infinite impulse response (IIR) filters may be implemented, however FIR filters exhibit improved stability and linear phase compared to the IIR filter. The FIR filter design parameters do not drastically change the loss or peak sidelobe level (PSL) of the pulse compression output.

Figure 1:
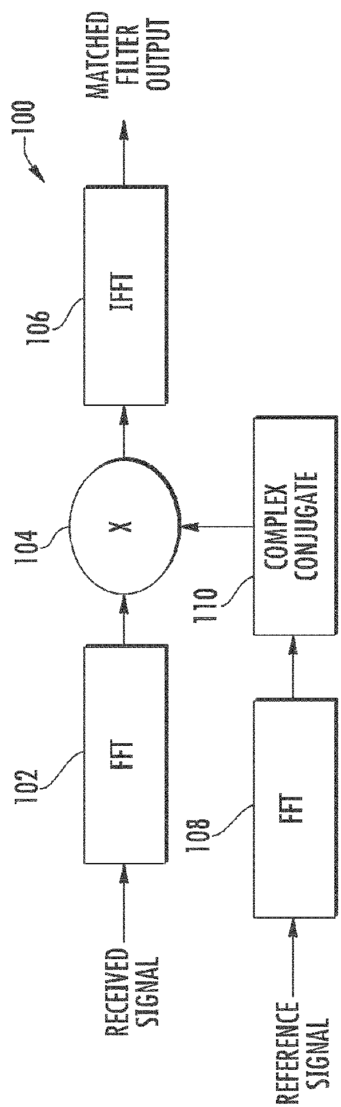
FIG. 1 illustrates a conventional signal processing channel.
Figure 2:
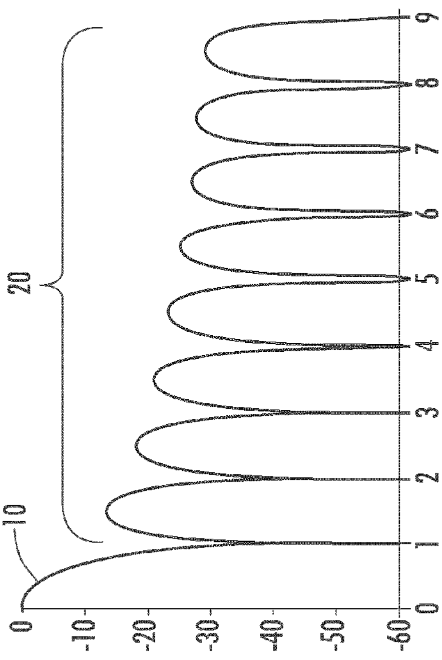
FIG. 2 illustrates a pulse compressed output having a mainlobe and a plurality of side lobes.
Figure 3B:
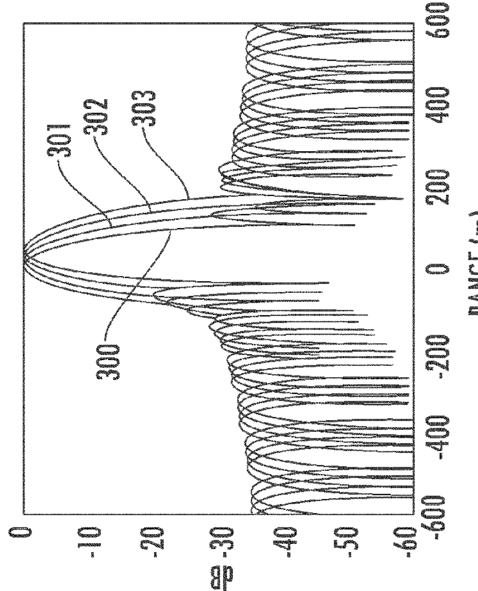
FIGS. 3A-3D illustrate the Doppler tolerance of a nonlinear frequency modulated waveform for a variety of target velocities and time bandwidth products.
Figure 3D:
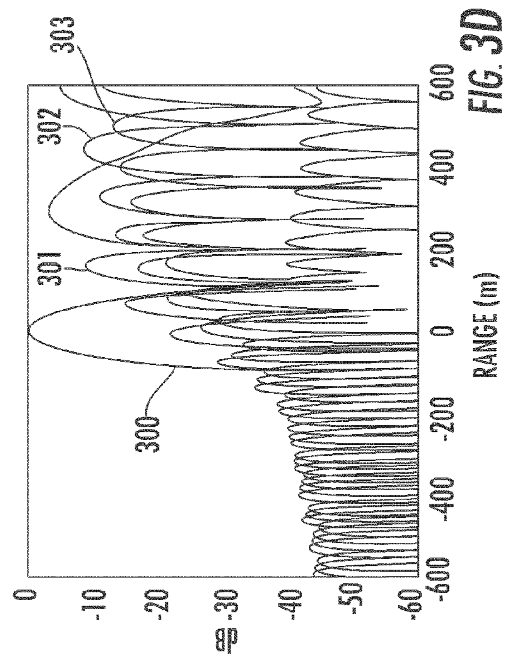
Figure 3A:
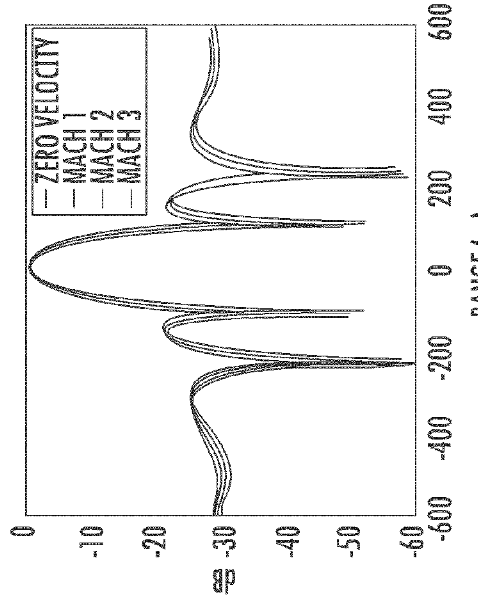
Figure 3C:
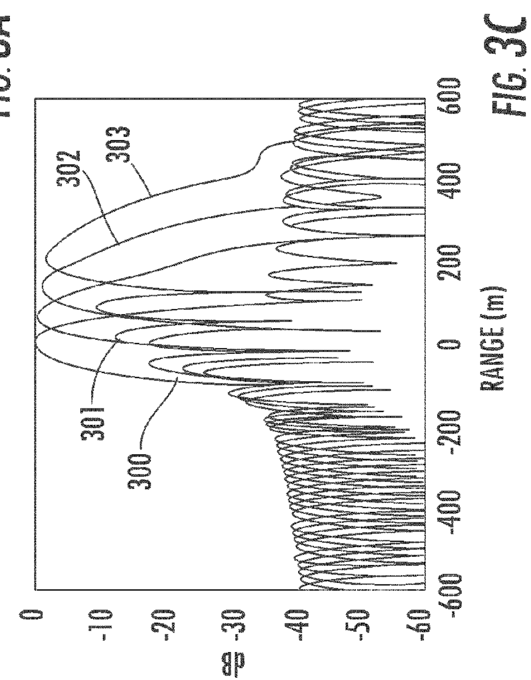
Figure 7:
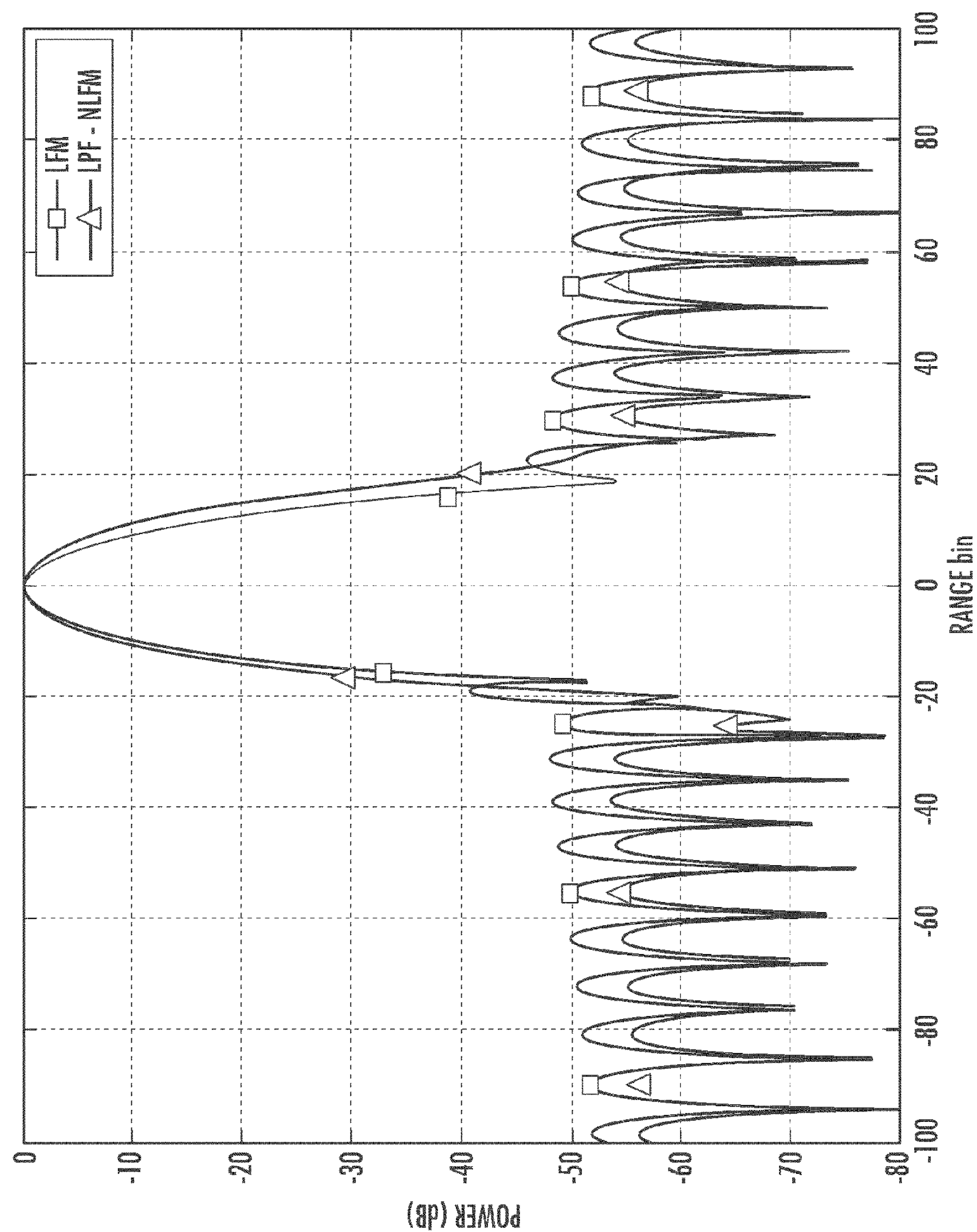
FIG. 7 is a graph illustrating the pulse compressed waveform output from a conventional signal processing channel for processing nonlinear frequency modulated signals and the pulse compressed waveform output from an improved signal processing channel.

FIG. 7 is a power versus frequency graph illustrating the pulse compressed outputs for an NLFM waveform processed by a conventional pulse compression processing channel 100 illustrated in FIG. 1 and the same NLFM waveform processed by the improved pulse compression processing channel 400 illustrated in FIG. 4 and processed by the method illustrated in the flow diagram in FIG. 5. The NLFM waveform is simulated for the TB product of 2048 with eight times oversampling to generate 16384 samples. Only the central part of the pulse compression output of ±100 samples is shown in FIG. 7. As shown in FIG. 7, the response of the processing channel 400 has lower sidelobe levels than the response of the NLFM waveform processed by the conventional processing channel illustrated in FIG. 1. The increased sidelobe level in the response of the conventional processing channel shown in FIG. 1 is due to the uncompensated Doppler effect in the NLFM waveform.

Figure 8:
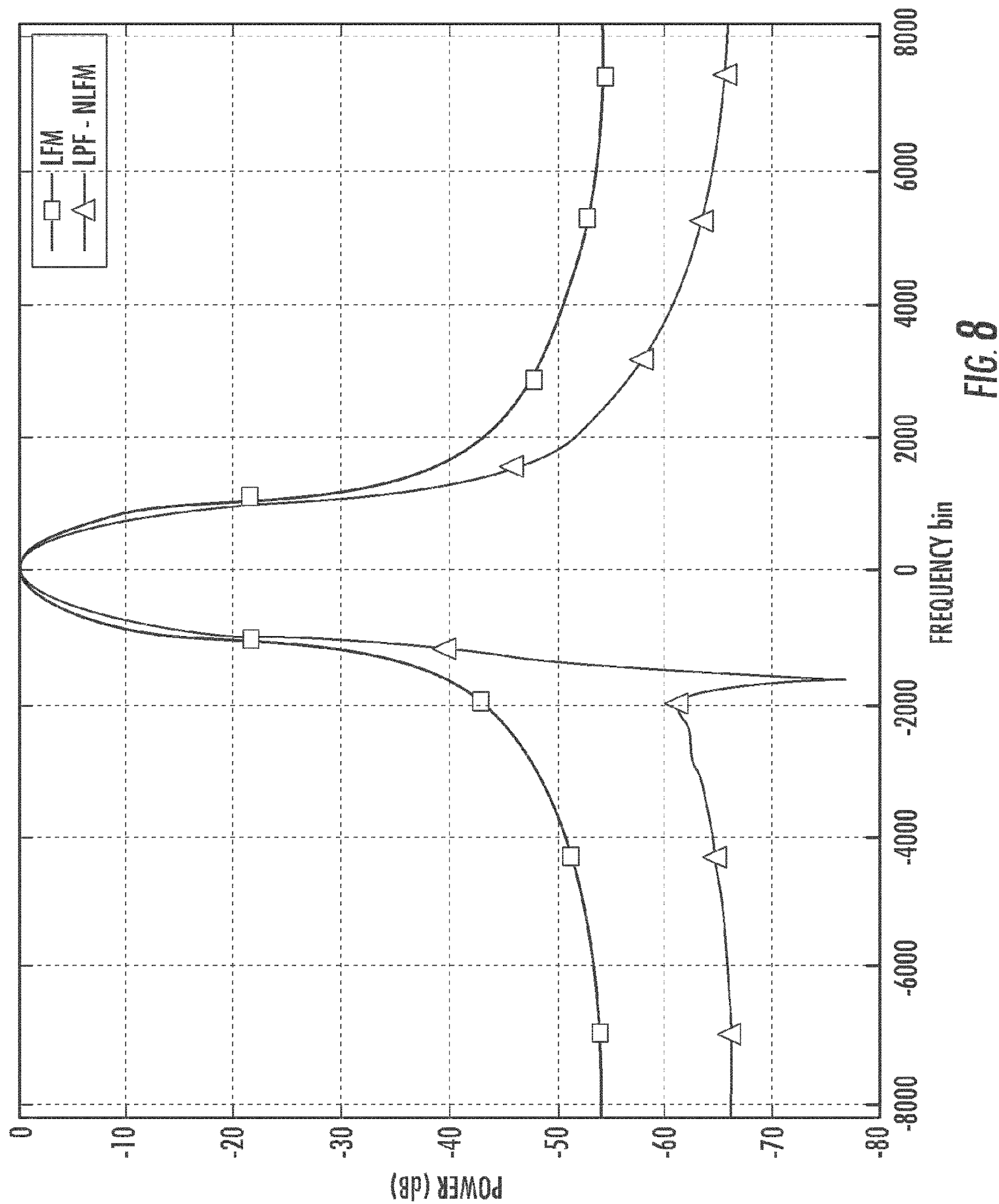
FIG. 8 is a graph illustrating the spectrums of the pulsed compressed outputs of a conventional signal processing channel and an improved signal processing channel for nonlinear frequency modulated signals.
Figure 9:
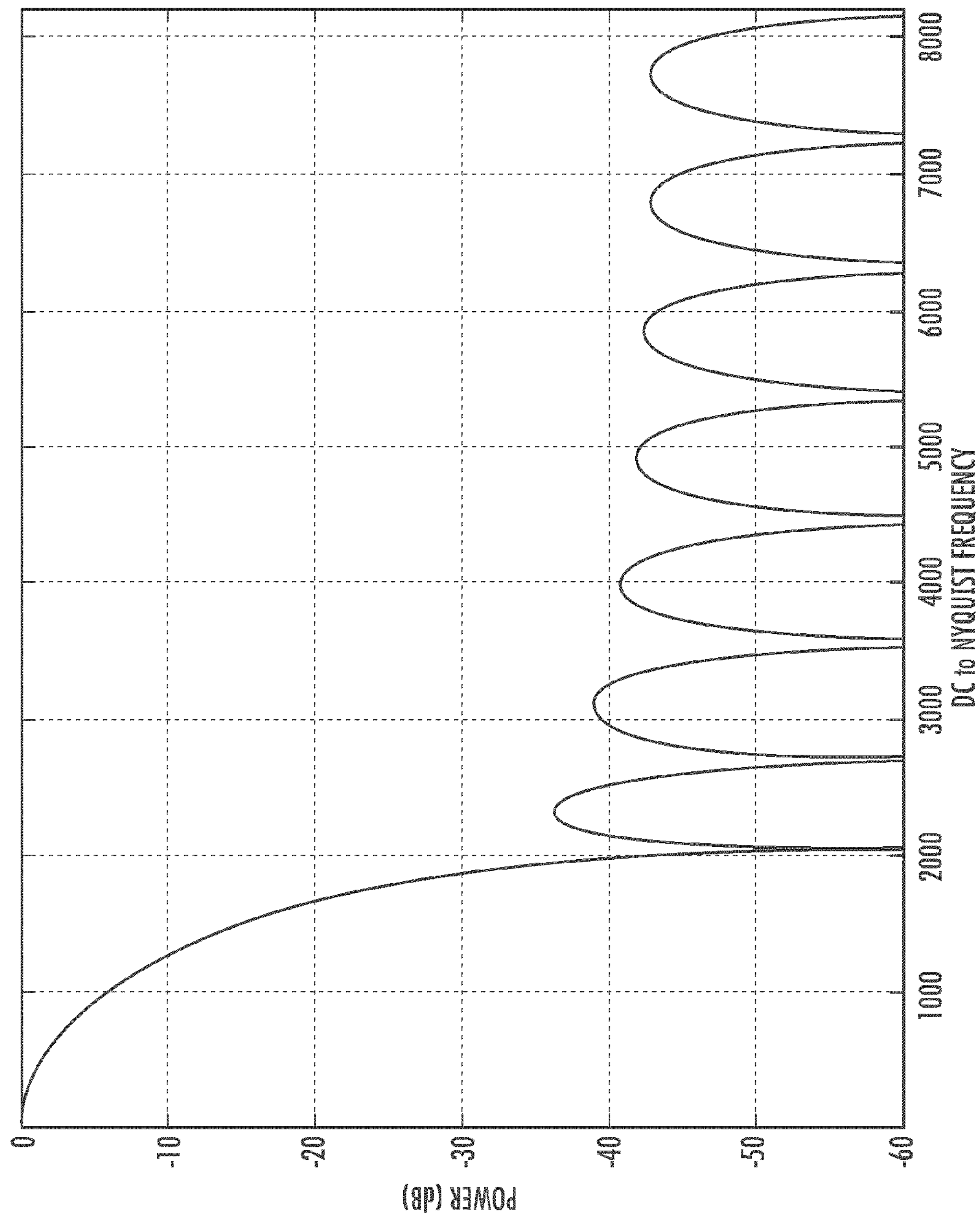
FIG. 9 is a graph illustrating the frequency response of a low pass filter in accordance with the signal processing channel illustrated in FIG. 4.

FIG. 8 illustrates the spectrum of the NLFM waveform as well as the spectrum of the low-pass filtered version of the NLFM waveform in accordance with the graph in FIG. 7. The mismatch in the two waveforms illustrated in FIG. 8 contributes to the small loss in pulse compression and improved range sidelobe performance of the filter and method described herein.

The present system and method may be embodied in the form of computer-implemented processes and system for practicing those processes. The disclosed system and method may also be embodied in the form of computer program code embodied in tangible machine readable storage media, such as random access memory (RAM), floppy diskettes, read only memories (ROMs), CD-ROMs, hard disk drives, flash memories, optical disc, or any other machine-readable storage medium, wherein, when the computer program code is loaded into and executed by a computer, the computer becomes an apparatus for practicing the method. The disclosed system and method may also be embodied in the form of computer program code loaded into and/or executed by a computer, such that, when the computer program code is loaded into and executed by a computer, the computer becomes an apparatus for practicing the method. When implemented on a general-purpose processor, the computer program code segments configure the processor to create specific logic circuits. The disclosed system and method may alternatively be embodied in a digital signal processor formed of application specific integrated circuits for performing a method according to the principles disclosed herein.

Although the system and method have been described in terms of exemplary embodiments, it is not limited thereto. Rather, the appended claims should be construed broadly, to include other variants and embodiments of the system and method, which may be made by those skilled in the art without departing from the scope and range of equivalents.

What is claimed is:

1. A signal processing method for improving the Doppler tolerance of a non-linear frequency modulated (NLFM) waveform, the method comprising:

transforming a received NLFM waveform from a first domain to a second domain;

multiplying the transform of the received NLFM waveform with a complex conjugate of a low-pass filtered and transformed reference signal; and inverse transforming a product of the multiplication from the second domain to the first domain.

2. The signal processing method of claim 1, further comprising:

sampling the received NLFM waveform using an analog-to-digital converter prior to the transforming step.

3. The signal processing method of claim 1, further comprising:
low-pass filtering a reference NLFM waveform;
transforming the low-pass filtered reference NLFM waveform from the first domain to the second domain; and
providing a complex conjugate of the transformed low-pass filtered reference NLFM waveform.

4. The signal processing method of claim 3, further comprising:
transmitting an NLFM waveform; and
using a copy of the transmitted NLFM waveform as the reference NLFM waveform.

5. The signal processing method of claim 4, wherein the received NLFM waveform is a reflection of the transmitted NLFM waveform.

6. The signal processing method of claim 1, wherein the transform of the received NLFM waveform is performed using a fast Fourier transform (FFT).

7. The signal processing method of claim 6, wherein the inverse transform of the product of the multiplication from the second domain to the first domain is performed using an inverse FFT (IFFT).

8. The signal processing method of claim 1, wherein the first domain is a time domain and the second domain is a frequency domain.

9. A system for processing a nonlinear frequency modulated (NLFM) waveform, comprising:
a computer readable storage medium; and
a processor in signal communication with the computer readable storage medium, the processor configured to:
transform a received NLFM waveform from a first domain to a second domain;
multiply the transform of the received NLFM waveform against a complex conjugate of a low-pass filtered and transformed reference signal; and
inverse transform a product of the multiplication from the second domain to the first domain.

10. The system of claim 9, further comprising an analog-to-digital converter (ADC) in signal communication with the processor, the ADC configured to sample the received NLFM waveform.

11. The system of claim 9, further comprising a low-pass filter for filtering a reference NLFM waveform, the processor configured to:
transform the low-pass filtered reference NLFM waveform from the first domain to the second domain; and
provide a complex conjugate of the low-pass filtered and transformed reference NLFM waveform.

12. The system of claim 11, further comprising an antenna configured to transmit an NLFM waveform in signal communication with the processor, wherein the processor is configured to use a copy of the transmitted NLFM waveform as the reference NLFM waveform.

13. The system claim 12, wherein the received NLFM waveform is a reflection of the transmitted NLFM waveform.

14. The system of claim 9, wherein the transform of the received NLFM waveform is performed using a fast Fourier transform (FFT).

15. The system of claim 14, wherein the inverse transform of the product of the multiplication from the second domain to the first domain is performed using an inverse FFT (IFFT).

16. A non-transitory computer readable storage medium encoded with computer program code, such that when the computer program code is executed by a processor, the processor performs a method, the method comprising:
transforming a received NLFM waveform from a first domain to a second domain;
multiplying the transform of the received NLFM waveform with a complex conjugate of a low-pass filtered and transformed reference signal; and
inverse transforming a product of the multiplication from the second domain to the first domain.

17. The non-transitory computer readable storage medium of claim 16, the method further comprising:
low-pass filtering a reference NLFM waveform;
transforming the low-pass filtered reference NLFM waveform from the first domain to the second domain; and
providing a complex conjugate of the transformed low-pass filtered reference NLFM waveform.

18. The non-transitory computer readable storage medium of claim 17, the method further comprising:
transmitting an NLFM waveform; and
using a copy of the transmitted NLFM waveform as the reference NLFM waveform.

19. The non-transitory computer readable storage medium of claim 18, wherein the received NLFM waveform is a reflection of the transmitted NLFM waveform.

20. The non-transitory computer readable storage medium of claim 16, wherein the transform of the received NLFM waveform is performed using a fast Fourier transform (FFT), and wherein the inverse transform of the product of the multiplication from the second domain to the first domain is performed using an inverse FFT (IFFT).

* * * * *